April 11, 1967 ISAO INUZUKA ETAL 3,313,427
CONTROL SYSTEM WITH VEHICLE DETECTING MEANS
FOR PARKING BUILDINGS
Filed Nov. 27, 1963 6 Sheets-Sheet 1

INVENTORS
ISAO INUZUKA
HIDEO MIYAO
TAKEO YUMINAKA
BY Paul M. Craig, Jr.

ATTORNEY

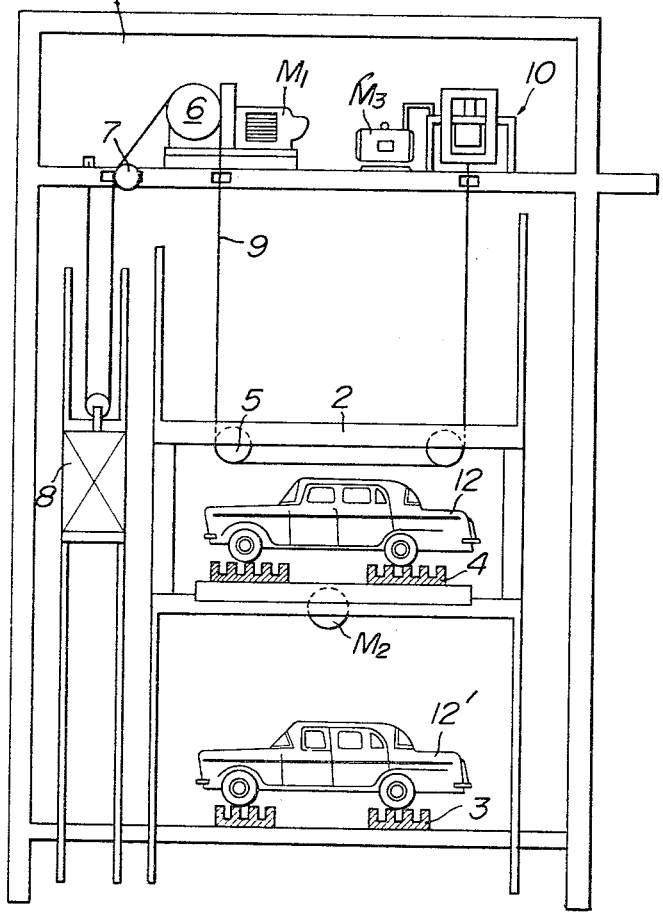

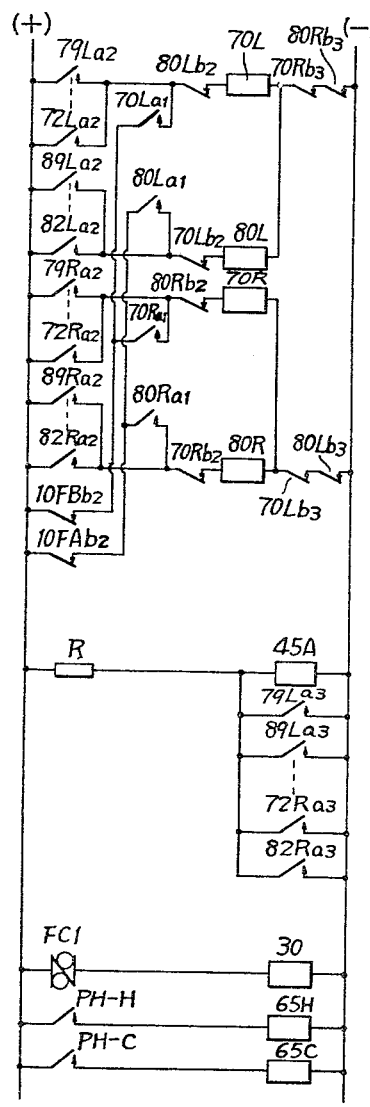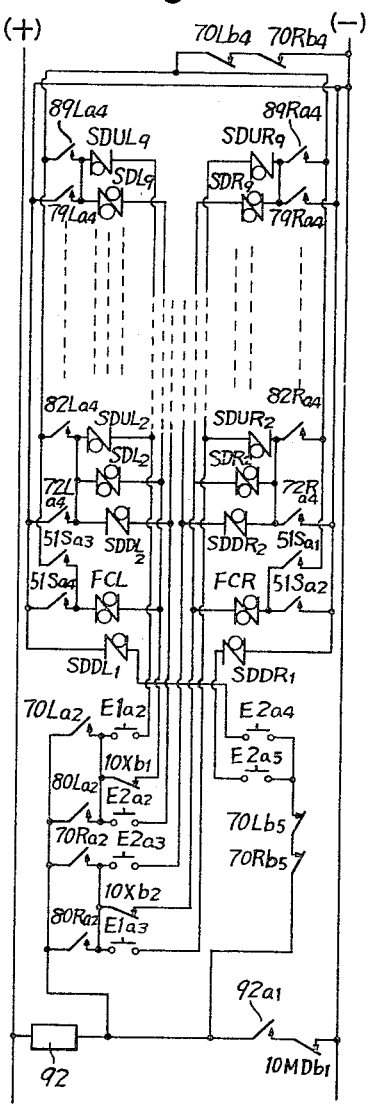
Fig. 5
Fig. 6

INVENTORS
ISAO INUZUKA
HIDEO MIYAO
TAKEO YUMINAKA
BY Paul M. Craig, Jr.
ATTORNEY 3,313,427
CONTROL SYSTEM WITH VEHICLE DETECTING
MEANS FOR PARKING BUILDINGS
Isao Inuzuka, Hideo Miyao, and Takeo Yuminaka, all of
Katsuta-shi, Japan, assignors to Hitachi, Ltd., Tokyo,
Japan, a corporation of Japan
Filed Nov. 27, 1963, Ser. No. 326,471
Claims priority, application Japan, Nov. 27, 1962,
37/52,070, 37/52,071
4 Claims. (Cl. 214—16.1)

The present invention relates to a system and apparatus for controlling a parking building wherein a plurality of parking spaces are disposed in vertically spaced and tiered relation opposite an elevator shaft for an elevator cage.

With the increase in the number of automotive vehicles in recent years, the necessity for large scale parking facilities is increasing, and, as a result, an especially remarkable development has been made through use of parking buildings combined with a highly efficient elevator systems.

The primary object of the invention is to provide a fully automatic control system and apparatus adapted for an extremely efficient, simple and easy operation of such a parking building.

Another object of the invention is to provide a control system and apparatus adapted for a parking building wherein entrance of an automotive vehicle into a desired parking space and departure therefrom can be effected by simple manipulation of single indicating control means corresponding to each of a plurality of parking spaces.

Still another object of the invention is to provide a control system and apparatus for a parking building wherein means are provided to detect the presence of vehicles in respective parking spaces and at an inlet and outlet of said parking building so that mere manipulation of single indicating control means corresponding to each parking space can selectively control the entrance of an automotive vehicle therein or departure therefrom.

Yet another object of the invention is to provide a control system and apparatus adapted for a parking building wherein a lifting and lowering sequence of an elevator cage for carrying vehicles is provided separately from a vehicle transfer sequence between the elevator cage and parking spaces, and between the elevator cage and vehicle inlet and outlet. According to the invention, both sequences are interrelated with each other and alternately actuated in order to eliminate the complication of the sequence of entrance and departure of the vehicles.

Further another object of the invention is to provide a control system and apparatus adapted for a parking building wherein the operating condition is checked at the end of each of said sequences and then the subsequent sequence is started so that an undesirable accident such as double parking can be avoided. By the provision of said checking means, the apparatus of the invention is operable in response to successive orders when, for example, departure is ordered within a definite period after entrance has been ordered.

There are other objects and particularities of the invention which will be obvious from the following description with reference to the accompanying drawings, in which:

FIG. 2 is an enlarged vertical sectional side view of part of the parking building of FIG. 1;

FIGS. 4–10 are electrical circuit diagrams constituting the control system of the invention.

Figure 1:
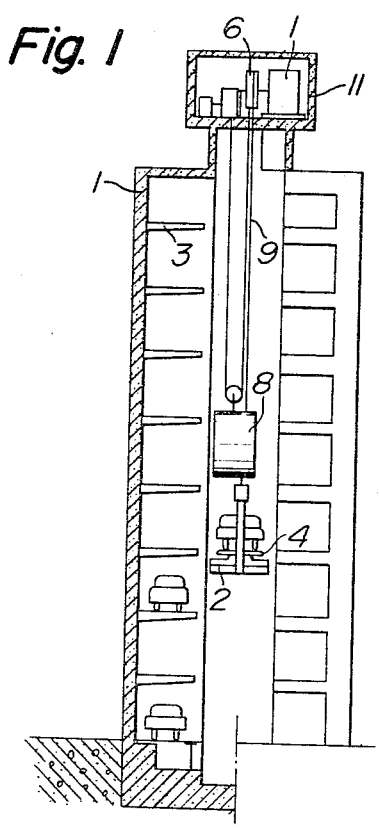
FIG. 1 is a vertical sectional view of a parking building to which a control system of the invention is applied.

FIGS. 1 and 2 show a general outline of the structure of a parking building 1. In each parking space, there is provided a cantilever fork 3 for supporting an automotive vehicle thereon. An elevator cage 2 is reciprocatively movable in an elevator shaft disposed in the vertical direction of said parking building 1. In the elevator cage 2, there is provided a fork 4 which automatically makes vertical as well as lateral movement so as to move towards and away from each parking fork 3 for engagement with the fork 3 in aligned relation thereto. The elevator driving mechanism includes a main lifting motor $M_1$, guide wheels 5 for the elevator lifting rope or during cable 9 which also pass over a grooved pulley 6 driven by the main lifting motor $M_1$, a deflector wheel 7, and a balance weight 8. One end of the lifting rope 9 is fitted to a driving piston 10 of an auxiliary lifting unit $M_3$ (or example, a hydraulic jack as shown in FIG. 2), while the other end thereof is guided over the grooved pulley 6 and fixed to a portion of the machine room 11 at a point substantially above the balance weight 8. The fork 4 disposed in the elevator cage makes the lateral movement necessary to insert the vehicle into a parking space by means of an electric motor $M_2$, while the auxiliary lifting unit $M_3$ acts to urge the elevator cage 2 a slight distance in the vertical direction. Automotive vehicles disposed in the cage 2 and on the parking fork 3 are indicated by numerals 12 and 12', respectively.

Figure 3:
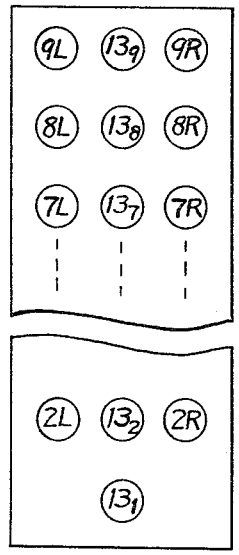
FIG. 3 is a schematic front view of a control panel for the parking building.

FIG. 3 shows a control panel associated with the parking building 1, in which numerals $13_9$ through $13_1$ designate elevator position indicating lamps. Symbols 2L–9L and 2R–9R designate lamp-lighting type push buttons corresponding to parking spaces from the second to ninth story disposed on the left- and right-hand sides of the elevator, respectively, and each push button has a mark of the corresponding parking space engraved therein.

In the following description, explanation will be made with reference to FIGS. 4–10, wherein normally open contacts are suffixed with $a$ and normally closed contacts are suffixed with $b$ to provide a clear distinction therebetween.

Figure 4:
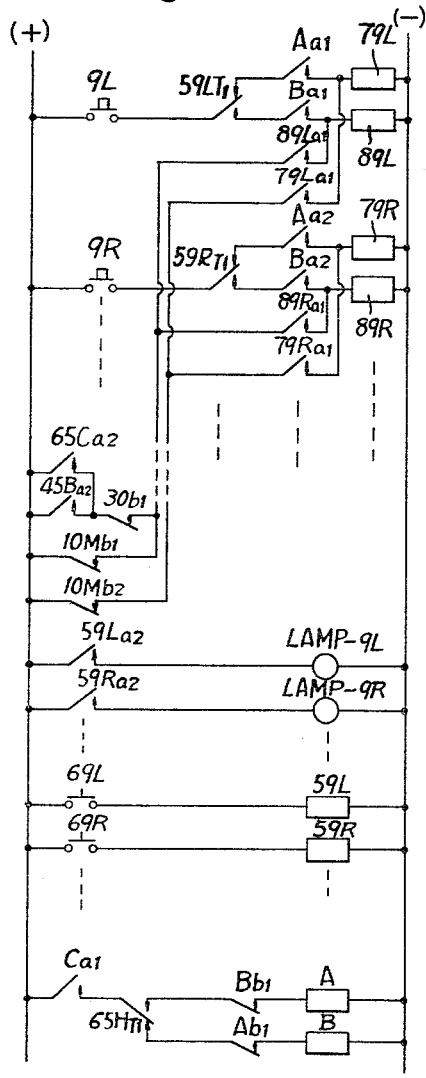

In FIG. 4, it will be seen that contacts $59L_{T1}$ and $59R_{T1}$ of full-empty parking space selecting relays 59L and 59R are connected in series with the contacts 9L and 9R of the push buttons of the control panel shown in FIG. 3, respectively. The contacts $59L_{T1}$ and $59R_{T1}$ are connected with parking floor entrance ordering relays 79L and 79R through contacts $A_{a1}$ and $A_{a2}$ of an entrance indicating relay A, respectively, and with parking floor departure ordering relays 89L and 89R through contacts $B_{a1}$ and $B_{a2}$ of a departure indicating relay B, respectively. These connections are made for each of the parking storys, but the connections for the ninth story alone are illustrated to avoid confusion. The relays 79L and 79R form self-sustaining circuits through respective normally open contacts $79L_{a1}$ and $79R_{a1}$ and contacts $10M_{b2}$ of a fork mechanism operation ordering relay 10M. The relays 89L and 89R also form self-sustaining circuits through respective normally open contacts $89L_{a1}$ and $89R_{a1}$, contact $10M_{b1}$ of the fork mechanism operation ordering relay 10M, contacts $65C_{a2}$ of an in-cage entrance detecting relay 65C, contacts $45B_{a2}$ of a successive entrance and departure order detecting relay 45B, and contacts $30_{b1}$ of a first-story position relay 30. The push button lamps on the control panel, i.e., LAMP–2L through LAMP–9L and LAMP–2R through LAMP–9R (LAMP–9L and LAMP–9R only shown) are connected in series with contacts $52L_{a2}$ through $59L_{a2}$ and $52R_{a2}$ through $59R_{a2}$ ($59L_{a2}$ and $59R_{a2}$ only shown) of the full-empty parking space selecting relays, respectively. The full-empty parking space selecting relays 52L through 59L and 52R through 59R connected to a power source in series with contacts 62L through 69L and 62R through 69R of full-empty detecting means. An arrangement is made so that, when, for example, the parking space on the left-hand side of the ninth story is full, the contacts 69L are closed to energize the full-empty parking space selecting relay 59L for the left-hand side parking space of the ninth story.

According to the invention, the entrance indicating relay A must be so set that it is energized only when an automotive vehicle is at a definite position in an entrance space at the inlet of the first story. Therefore, it may be understood that, in the energizing circuit of the relay A, contacts of a relay for detecting the entrance of a vehicle vehicle in the entrance space at the inlet of the first story are connected in series with contacts which are closed when no vehicle is positioned at a space other than the definite position in said entrance space. The former is contacts $65H_{T1}$ (normally open contact side) and the latter is contacts $C_{a1}$. Since, further, said contact $C_{a1}$ are closed even when said parking space is empty, the departure indicating relay B is connected to the power source through the contacts $C_{a1}$ and the entrance detecting contacts $65H_{T1}$ (normally closed contact side). Since, also, simultaneous energization of the entrance detecting relay A and the departure detecting relay B must be avoided to eliminate any possible danger, normally closed contacts $B_{b1}$ and $A_{b1}$ are interposed in the energizing circuits of the respective relays A and B.

In FIG. 5, it will be seen that left and right entrance relays 70L and 70R are connected with contacts $80L_{b2}$ and $80R_{b2}$ of departure relays 80L and 80R in series with a parallel circuit of contacts $79L_{a2}$ through $72L_{a2}$ and a parallel circuit of contacts $79R_{a2}$ through $72R_{a2}$ of parking floor entrance ordering relays 79L through 72L and 79R through 72R, respectively. The departure relays 80L and 80R are connected with contacts $70L_{b2}$ and $70R_{b2}$ in series with a parallel circuit of contacts $89L_{a2}$ through $82L_{a2}$ and a parallel circuit of $89R_{a2}$ through $82R_{a2}$ of parking floor departure ordering relays 89L through 82L and 89R through 82R, respectively. Further, the entrance relay 70L and the departure relay 80L are connected in parallel with these circuits and then with the power source through contacts $70R_{b3}$ and $80R_{b3}$, respectively. Circuits of the entrance relay 70R and the departure relay 80R for the right-hand side parking spaces are likewise connected to the power source through contacts $70L_{b3}$ and $80L_{b3}$, respectively. Thus, the entrance and departure orders from the respective parking floors are selected to issue a single order. Self-sustaining circuits are formed by the normally open contacts $70L_{a1}$ and $70R_{a1}$ of the respective left and right entrance relays 70L and 70R and contacts $10FB_{b2}$, and the circuits are sustained until the operation has been completed. Self-sustaining circuits are also formed by the normally open contacts $80L_{a1}$ and $80R_{a1}$ of the respective departure relays 80L and 80R and contacts $10FA_{b2}$, and the circuits are likewise sustained until the operation has been completed.

An entrance and departure order detecting relay 45A is connected to the power source in series with a series resistance R for preventing short-circuit, and, at the same time, connected in parallel with all of the contacts $79L_{a3}$ through $72L_{a3}$ and $79R_{a3}$ through $72R_{a3}$ of the parking floor entrance ordering relays and the contacts $89L_{a3}$ through $82L_{a3}$ and $89R_{a3}$ through $82R_{a3}$ of the parking floor departure ordering relays, so that closure of any of the contacts will short-circuit the relay 45A. When, therefore any of these contacts is closed by the parking floor entrance order, the order detecting relay 45A is short-circuited and deenergized. Further, cancellation of any of the entrance and departure orders will open all of these contacts, and the relay 45A is energized. Thus, presence of the entrance or departure order can be detected.

The first story position relay 30 is connected in series with contacts FC1 of a position interlocking contactor such as a floor controller which contacts the elevator when it is positioned at the first story. Therefore, the relay 30 is energized only when the elevator is positioned at the first story. Presence of the automotive vehicle in the entrance space at the first story inlet and in the elevator cage is detected by means such as a photoelectric unit. The photoelectric unit has contacts PH-H which is closed when a vehicle is brought into the entrance space at the first story inlet and placed at the predetermined position. This control PH-H is the contact of the relay A which is energized by the contacts $C_{a1}$ and $65H_{T1}$ (normally open contacts) described with reference to FIG. 4. The contacts PH-H are connected to the power source in series with the first story entrance space entrance detecting relay 65H. Therefore, the contacts PH-H are urged to the closed position to energize the relay 65H when an automotive vehicle is brought into the entrance space at the first story inlet and stopped at the predetermined position. Contacts PH-C of a photoelectric unit are disposed in the cage and connected to the power source in series with the in-cage entrance detecting relay 65C. The contacts PH-C are closed to energize said relay 65C whenever there is a vehicle in the cage, and thus serves to detect the presence of the vehicle in the cage.

Explanation will next be made with reference to a decelerating circuit shown in FIG. 6. Symbols $SDUL_9$ through $SDUL_2$ and $SDUR_9$ through $SDUR_2$ indicate contacts of floor controllers for upward movement deceleration, and specific contacts are closed when the elevator during its upward movement reaches a preset position below a desired parking space. Symbols $SDDL_8$ through $SDDL_1$ and $SDDR_8$ through $SDDR_1$ ($SDDL_2$, $SDDL_1$, $SDDR_2$ and $SDDR_1$ only shown in FIG. 6) indicate contacts of floor controllers for downward movement deceleration, and each contacts are closed when the elevator during its downward movement reaches a preset position above the corresponding parking floor. Symbols $SDL_9$ through $SDL_2$ and $SDR_9$ through $SDR_2$ (only a few of them shown) indicate contacts of decelerating floor controllers, and each contacts are closed when the elevator reaches a preset position before a corresponding parking floor in both of upward and downward movement. Symbols FCL and FCR are contacts of floor position detecting controllers and are closed when the cage is positioned at a preset position opposite a desired parking floor. Said contacts of the floor controllers form energizing circuits of a cage decelerating relay 92 through contacts $79L_{a4}$ through $72L_{a4}$ and $79R_{a4}$ through $72R_{a4}$ of the parking floor entrance ordering relays and contacts $89L_{a4}$ through $82L_{a4}$ and $89R_{a4}$ through $82R_{a4}$ of the parking floor departure ordering relays, through contacts $E1_{a2}$ and $E1_{a3}$ of a main lifting motor normal rotation relay E1 and contacts $E2_{a2}$ and $E2_{a3}$ of a main lifting motor reverse rotation relay E2, and contacts $10X_{b1}$ and $10X_{b2}$ of a travelling cage relay 10X, and through the contacts $70L_{a2}$ through $80R_{a2}$ of the entrance and departure relays. The energizing circuits associated with departure of vehicles are connected through contacts $70L_{b4}$ and $70R_{b4}$ of the entrance relays to the negative side of the power source, wherein a decelerating circuit for the entrance operation is formed at first and, at the completion of said entrance operation, a decelerating circuit for the departure operation is formed in the successive entrance and departure operation which will be explained in the later description.

A self-sustaining circuit of the cage decelerating relay 92 is formed by normally open contacts $92_{a1}$ thereof and contacts $10MD_{b1}$ of a time limit relay 10MD for ordering operation of the fork mechanism. Besides said decelerating circuits, the contacts $SDDL_1$ and $SDDR_1$ of the downward movement deceleration floor controllers for the first story directly form an energizing circuit of the relay 92 through contacts $E2_{a4}$ and $E2_{a5}$ of the main motor reverse rotation relay E2 and contacts $70L_{b5}$ and $70R_{b5}$ of the entrance relays.

Figure 7:
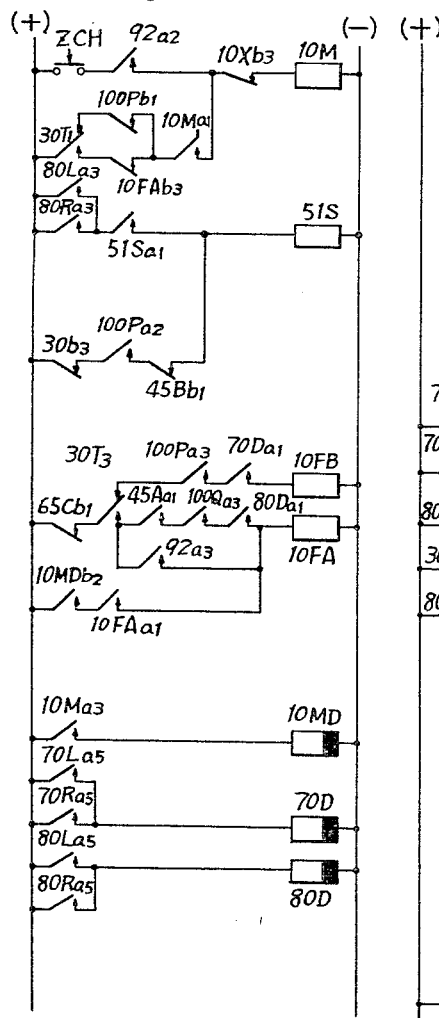

Referring to FIG. 7, the fork mechanism operation ordering relay 10M is connected to the power source in series with cage stopped position confirmation switches ZCH provided at the respective parking floors in the elevator shaft, contacts $92_{a2}$ of the decelerating relay 92 and contacts $10X_{b3}$ of the travelling cage relay 10X. The switches confirm that the cage is stopped at a definite position where the fork operation can be made, to thereby energize the relay 10M for giving an order for the fork operation. A self-sustaining circuit of the relay 10M is formed by contacts $10M_{a1}$ thereof, contacts $30_{T1}$ of the first story position relay 30, contacts $100P_{b1}$ of an elevator starting ordering relay 100P and contacts $10FA_{b3}$ of a departure operation completion relay 10FA. An energizing circuit of a first story returning relay 51S is formed by a series circuit of contacts $30_{b3}$ of the first story position relay 30, contacts $100P_{a2}$ of the elevator starting ordering relay 100P and contacts $45B_{b1}$ of a successive entrance and departure order detecting relay 45B. A self-sustaining circuit of the relay 51S is formed by contacts $51S_{a1}$ thereof and contacts $80L_{a3}$ or $80R_{a3}$ of the departure relay 80L or 80R. The departure operation completion relay 10FA is energized by an energizing circuit comprising the contacts $65C_{b1}$, normally open contact side of the contacts $30_{T3}$, contacts $45A_{a1}$ of the entrance and departure order detecting relay 45A, contacts $100Q_{a3}$ of a departure and elevator starting ordering relay 100Q and contacts $80D_{a1}$ of a departure order time limit relay 80D or energized by an energizing circuit directly connected thereto through contacts $92_{a3}$ of the decelerating relay 92 from the normally open contact side of said contacts $30_{T3}$. At the same time, a self-sustaining circuit of the relay 10FA is formed by its normally open contacts $10FA_{a1}$ and contacts $10MD_{b2}$ of the fork operation order time limit relay 10MD. An energizing circuit of an entrance operation completion relay 10FB is formed by the contacts $65C_{b1}$ of the in-cage entrance detecting relay 65C, normally closed contact side of the contact $30_{T3}$ of the first story position relay 30, contacts $100P_{a3}$ of the elevator starting ordering relay 100P and contacts $70D_{a1}$ of an entrance order time limit relay 70D.

Hereinunder, explanation will be given with regard to the operation of said relays 10FA and 10FB. The relay 10FB issues the entrance operation completion order when the cage has been stopped at a desired parking floor and the predetermined fork operation has been completed by the order of entrance operation. The relay 10FA provides the departure operation completion order when a specific vehicle has been brought down to the outlet of the first story by the order of departure operation. Thus, the relays provide the order of completion of operation exerted by the control system of the invention.

The fork operation order time limit relay 10MD is energized through contacts $10M_{a3}$ of the fork operation ordering relay 10M, while the entrance time limit relay 70D is energized through either of contacts $70L_{a5}$ and $70R_{a5}$ of the entrance relays, and the departure time limit relay 80D is energized through either of contacts $80L_{a5}$ and $80R_{a5}$ of the departure relays. These relays are adapted to urge their contacts as soon as the respective energizing circuits are closed, but, in the case of open circuit of the energizing circuits, the contacts of the respective relays operate with a predetermined time limit.

Figure 8:
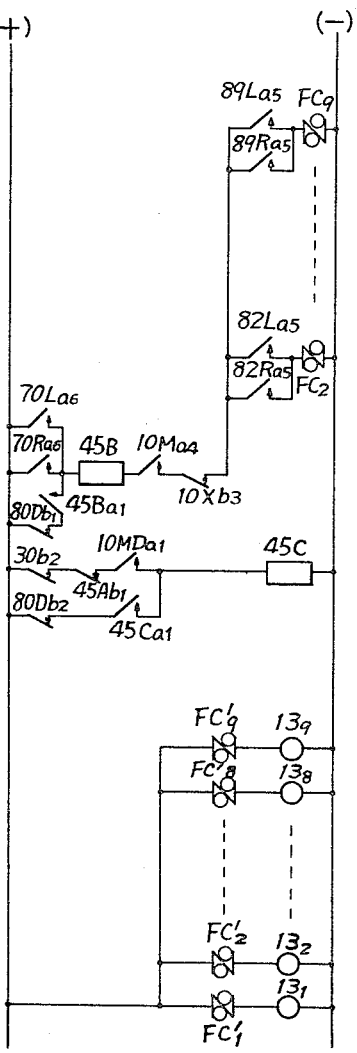

Referring to FIG. 8, an energizing circuit of the successive entrance and departure ordering relay 45B is formed by contacts $70L_{a6}$ or $70R_{a6}$ of the entrance relay 70L or 70R, contacts $10M_{a4}$ of the fork operation relay 10M, contacts $10X_{b3}$ of the travelling cage relay 10X, contacts $89L_{a5}$ through $82L_{a5}$ and $89R_{a5}$ through $82R_{a5}$ of the parking floor departure ordering relays, and contacts $FC_9$ through $FC_2$ of the floor controllers which are closed solely at a parking floor corresponding to the position of the elevator. When, therefore, it is desired to bring a vehicle into, for example, the parking space on the left-hand side of the ninth story and bring a vehicle out of the parking space on the opposite or right-hand side of the same story, contacts $70L_{a6}$ are closed at first by the entrance order and the elevator is stopped at the ninth story, then the fork operation, which will be explained later, is started. The contacts $89R_{a5}$ of the departure ordering relay 89R for the right-hand side parking space of the ninth story having been pre-registered are closed and the contacts $FC_9$ of the floor controller are closed due to the position of the elevator at the ninth story. Therefore, said successive entrance and departure ordering relay 45B is energized at the same time. Simultaneously with the energization of the relay 45B, the relay 45B forms the self-sustaining circuit with the contacts $80D_{b1}$ of the departure time limit relay 80D and its own contacts $45B_{a1}$.

| Four action relay | Sequence | Motor | Relay | Action | Action diagram |
|---|---|---|---|---|---|
| $A_1$ | 1 | $M_2$ | $F_1$ | Fork moving leftwards | |
| | 2 | $M_3$ | $H_1$ | H.J. lifting | |
| | 3 | $M_2$ | $F_2$ | Fork retracted | |
| | 4 | $M_3$ | $H_2$ | H.J. lowering | |
| $A_2$ | 1 | $M_2$ | $F_2$ | Fork moving rightwards | |
| | 2 | $M_3$ | $H_1$ | H.J. lifting | |
| | 3 | $M_2$ | $F_2$ | Fork retracted | |
| | 4 | $M_3$ | $H_2$ | H.J. lowering | |
| $A_3$ | 1 | $M_3$ | $H_1$ | H.J. lifting | |
| | 2 | $M_2$ | $F_1$ | Fork moving leftwards | |
| | 3 | $M_3$ | $H_2$ | H.J. lowering | |
| | 4 | $M_2$ | $F_2$ | Fork retracted | |
| $A_4$ | 1 | $M_3$ | $H_1$ | H.J. lifting | |
| | 2 | $M_2$ | $F_2$ | Fork moving rightwards | |
| | 3 | $M_3$ | $H_2$ | H.J. lowering | |
| | 4 | $M_2$ | $F_1$ | Fork retracted | |

An energizing circuit of a non-interference relay 45C is formed by contacts $30_{b2}$ of the first story position relay 30, contacts $45A_{b1}$ of the entrance and departure order detecting relay 45A, and contacts $10MD_{a1}$ of the fork operation order time limit relay 10MD. At the same time, a self-sustaining circuit of the relay 45C is formed by its own contacts $45C_{a1}$ and contacts $80D_{b2}$ of the departure time limit relay 80D. The relay 45C is adapted to detect the successive entrance and departure order for different parking floors which cannot be detected by said successive entrance and departure order detecting relay 45B. Symbols $FC'_9$ through $FC'_1$ indicate contacts of a floor controller similar to the aforesaid contacts $FC_9$ through $FC_2$ and $FC_1$. The contacts $FC'_9$ through $FC'_1$ are closed at the floors corresponding to the one through which the elevator travels. The lamps $13_9$ through $13_1$ are connected to the corresponding contacts $FC'_9$ through $FC'_1$ to indicate the travelling position of the elevator. The elevator position indicating lamps $13_9$ through $13_1$ are mounted in the control panel of FIG. 3.

Figure 9:
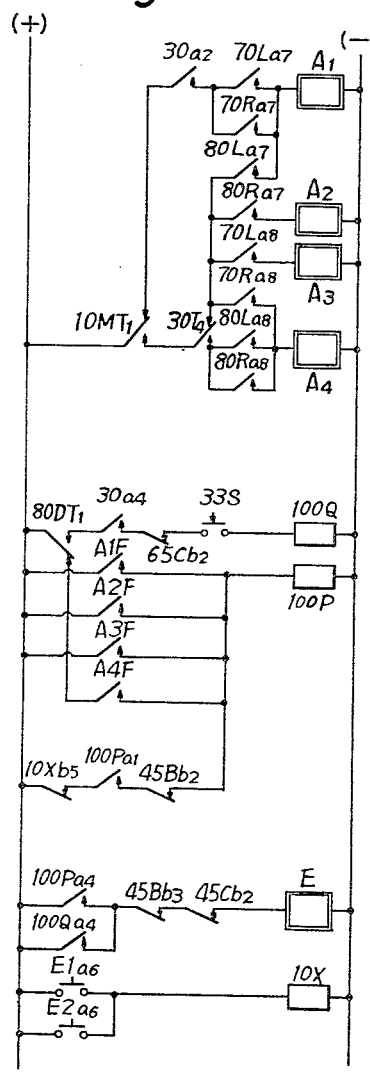

In FIG. 9, there are shown four sequential action circuit relays $A_1$ through $A_4$ which control entrance and departure of a vehicle between the cage and the parking spaces. The relays $A_1$ through $A_4$ have their respective energizing circuits connected through contacts $79L_{a7}$ through $80R_{a8}$ of the entrance and departure relays to contacts $10M_{T1}$ of the fork operation ordering relay 10M and contacts $30_{a2}$ and $30_{T4}$ of the first story position relay 30. The four sequential action circuit relays $A_1$ through $A_4$ are adapted to perform four actions in a predetermined sequence as shown in the above table.

The circuit relay $A_1$, for example, when actuated, acts to close an energizing circuit of a relay $F_1$ for effecting normal rotation of the fork driving motor $M_2$ within the cage, and the fork 4, described with reference to FIGS. 1 and 2, is urged into the left-hand side parking space by the fork driving motor $M_2$. In this case, it is so arranged that the top surface of the movable fork 4 is disposed at a height slightly lower than that of the stationary fork 3 in the parking space (sequence 1). At the completion of the above operation, said relay $F_1$ is deenergized, and an energizing circuit of an auxiliary lifting unit normal rotation relay $H_1$ is formed, whereby the cage is slightly lifted (H.J. lifting) by the auxiliary lifting unit $M_3$ to take up the vehicle on the fork 3 in the parking space (sequence 2). Subsequently, the relay $H_1$ is deenergized. Relays $F_2$ and $H_2$ are successively energized and deenergized in the manner as described above, and the movable fork 4 in the cage, on which the vehicle is supported, is retracted inwardly into the cage which is then lowered (H.J. lowering) a slight distance down to the original position. Simultaneously with the completion of such four sequential actions, four sequential action completion ordering contacts A1F are closed. Other four sequential action circuit relays $A_2$ through $A_4$ operate in like manner. That is, the relay $A_2$ serves to carry a vehicle in the right-hand side parking space into the cage, $A_3$ serves to carry a vehicle in the cage into the left-hand side parking space, and $A_4$ serves to transfer a vehicle in the cage into the right-hand side parking space. The contacts A1F through A4F are automatically restored to their normal states after a predetermined time limit has elapsed.

An energizing circuit of the elevator starting ordering relay 100P is formed by either of said four sequential action completion ordering contacts A1F through A3F, or the normally closed contact side of the contacts $80D_{T1}$ of the departure relay 80D, and the contacts A4F. At the same time, a self-sustaining circuit of the relay 100P is formed by its normally open contacts $100P_{a1}$, contacts $10X_{b5}$ of the cage driving relay 10X and contacts $45B_{b2}$ of the successive entrance and departure order detecting relay 45B. An energizing circuit of the departure and elevator starting ordering relay 100Q is formed by the normally open contact side of said contacts $80D_{T1}$ of the departure relay 80D, contacts $30_{a4}$ of the first story position relay 30, contacts $65C_{b2}$ of the in-cage entrance detecting relay 65C, and a limit switch 33S which is closed when the fork 4 is positioned at the center of the cage.

An elevator direction selecting circuit relay E, when energized, gives an order to move the elevator upwardly if an entrance or departure order is issued for a parking space at a higher position than the stopped position of the elevator, and acts to close an energizing circuit of the main lifting motor normal rotation relay E1 which will be described later. When, on the contrary, the entrance or departure order is given for a parking space lower than the stopped position of the elevator, the relay E acts to close an energizing circuit of the relay E2 to rotate the main motor $M_1$ in the reverse direction. An energizing circuit of said direction selecting circuit relay E is formed by contacts $100P_{a4}$ of the elevator starting relay 100P, or contacts $100Q_{a4}$ of the departure and elevator starting relay 100Q, contacts $45B_{b3}$ of the successive entrance and departure order detecting relay 45B, and contacts $45C_{b2}$ of the non-interference relay 45C. An energizing circuit of the travelling cage relay 10X is formed by contacts $E1_{a6}$ of the main lifting motor normal rotation relay E1 or contacts $E2_{a6}$ of the main lifting motor reverse rotation relay E2. The travelling cage relay 10X is actuated whenever the main lifting motor $M_1$ rotates in either direction or the elevator is moving upwardly or downwardly to thereby detect that the elevator is travelling.

Explanation will next be made with reference to FIG. 10. The fork projecting relay F1, fork retracting relay F2, auxiliary lifting motor normal rotation relay H1 and auxiliary lifting motor reverse rotation relay H2 are energized through operating contacts $A_0$ of said four sequential action circuit relays A1 through A4 and contacts $43A_{a1}$ which are closed in case of an automatic operation. Energizing circuits of said relays F1 and F2 and those of said relays H1 and H2 are interlocked with each other at their normally closed contacts. The energizing circuits of the relays F1, F2, H1 and H2 are protected by mechanical limit switches $LS_1$ through $LS_4$ interposed in series therewith, respectively. Said relays F1, F2, H1 and H2 are further connected to push button switches B1 through B4, respectively, and are arranged to be energized through contacts $43B_a$, which are closed in case of a manual operation. Therefore, it is possible to perform transference of a vehicle between the cage and the parking space by the manual push button operation.

When the relay F1 is energized, the fork driving motor $M_2$ makes normal rotation to urge the fork mechanism 4 leftwards. By the energization of the relay F2, said motor $M_2$ is reversed in the rotation to urge the fork mechanism 4 rightwards. Likewise, by the energization of the relay H1 or H2, the auxiliary lifting motor $M_3$ makes normal or reverse rotation to lift or lower the elevator a slight distance (H.J. lifting or lowering as shown in the above table). The main lifting motor $M_1$ makes similar action by being energized by the relays E1 and E2. The relays E1 and E2 differ from the relays F1 through H2 in that self-sustaining circuits are formed by their own contacts $E1_{a1}$ and $E2_{a1}$ and contacts $91_{b1}$ of a stoppage ordering relay (not shown, a stoppage ordering high speed relay for an automatic elevator). The energizing circuits of said motor normal and reverse rotation relays F1 through E2 are collected together and connected to the power source through contacts SE which are arranged to open in an emergency. Therefore, in the event of emergency, the contacts SE are swung open to stop the motors $M_1$ through $M_3$.

In the following description, the invention will be explained in details with regard to entrance and departure of an automotive vehicle into and from the parking building, in which the explanation will be separately made with reference to (i) entrance, (ii) departure and (iii) successive entrance and departure.

(i) *Entrance*

Explanation will be made assuming that an automotive vehicle which comes into the entrance space on the left-hand side of the first story in FIG. 1 is brought into a selected parking space, which is the parking space on the left-hand side of the ninth story in this explanation. Assume that the vehicle is stopped at a predetermined position in the left-hand side entrance space of the first story, and the left-hand side parking space of the ninth story is empty, while the right-hand side parking space of the same story is full. In this case, the contacts 69R of the full-empty detecting means corresponding to the right-hand side parking space of the ninth story in FIG. 4 are closed to energize the full-empty selecting relay 59R, and at the same time the LAMP-9R is lit by the closure of its normally open contacts $59R_{a2}$. Therefore, the lamp-lighting push button 9R of FIG. 3 is lit to indicate that a vehicle is parked in the right-hand side parking space of the ninth story. Since the left-hand side parking space of the ninth story is empty, the contacts 69L are kept open and the lamp 9L is not lit. For the stories other than the ninth story, the push buttons corresponding to full parking spaces are lit. By the energization of the full-empty selecting relay 59R, the normally open contacts of its contacts $59R_{T1}$ are closed to change over the energizing circuit of the entrance ordering relay 79R to the energizing circuit of the departure ordering relay 89R, which therefore is solely energized. Therefore, as far as the right-hand side parking space of the ninth story is concerned, it is ready for receiving the departure order alone. Since, as described above, the full-empty selecting relay 59L for the left-hand side parking space of the ninth story is not energized, the normally closed contacts of its contacts $59L_{T1}$ are closed so that the energizing circuit of the entrance ordering relay 79L is solely formed, that is, the parking space is ready for receiving the entrance order alone.

Further, the contacts $C_{a1}$ of the photoelectric unit are closed since the vehicle stands at the predetermined position in the left-hand side entrance space of the first story. By the energization of the first story entrance space entrance detecing relay 65H, its contacts $65H_{T1}$ are actuated to energize the entrance indicating relay A through the circuit of $(+)-C_{a1}-65H_{T1}$ (normally open contact side)$-B_{b1}-A-(-)$. Energization of the relay A interlocks the departure indicating relay B, and, at the same time, closes the contacts $A_{a1}$, $A_{a2}$, ... in the energizing circuits of the parking space entrance relays 79L, 79R through 72L, 72R. When, under this state, it is desired to bring the vehicle into the left-hand parking space of the ninth story, the push button 9L may be just pushed down. By pressing the push button 9L, the entrance ordering relay 79L is energized through the circuit of $(+)-9L-59L_{T1}$ (normally closed contact side)$-A_{a1}-79L-(-)$, and, at the same time, self-sustained through the circuit of $(+)-10M_{b2}-79L_{a1}-(-)$.

By the energization of the entrance ordering relay 79L, the contacts $79L_{a2}$ are urged to the closed position, and the entrance relay 70L of FIG. 5 is energized through the circuit of $(+)-79L_{a2}-80L_{b2}-70R_{b3}-80R_{b3}-(-)$. Then, the self-sustaining circuit of the relay 70L is formed by the circuit of $(+)-10FB_{b2}-70L_{a1}-80L_{b2}-70L-70R_{b3}-80R_{b3}-(-)$, and, at the same time, the contacts $70L_{b2}$ and $70L_{b3}$ are urged to the open position. Thus, the energizing circuits of the entrance and departure relays 80L, 70R and 80R are cut off, and the single left-hand side entrance order is obtained.

Assume that, in this case, the elevator with the empty cage is positioned at the first story. Then, the first story position relay 30 of FIG. 5 is energized through the floor controller contacts $FC_1$. The first story parking space entrance detecting relay 65H is kept energized, as described above, by the closure of the contacts PH-H of the photoelectric unit since the vehicle is placed at the predetermined position at the inlet of the first story. The relay 65C is kept deenergized by the opening of the contacts PH-C of the photoelectric unit disposed in the cage. With regard to the remaining relays, the entrance time limit relay 70D of FIG. 7 is solely energized by the closure of the contacts $70L_{a5}$. Since the entrance relay 70L and the first story position relay 30 are thus energized, the contacts $30_{a2}$ and $70L_{a7}$ in FIG. 9 are closed to selectively energize the relay $A_1$ alone among the four sequential action circuit relays $A_1$ through $A_4$ through the circuit of $(+)-10M_{T1}$ (normally closed contact side)$-30_{a2}-70L_{a7}-A1-(-)$. The relay $A_3$ will not be energized as the normally closed contacts of the contacts $30_{T4}$ are open although the contacts $70L_{a8}$ are closed.

By the energization of the relay A1, the four sequential action circuit is successively followed as shown in the table. Then, the motor normal and reverse rotation relays of FIG. 10 are successively energized in the order of $F1 \rightarrow H1 \rightarrow F2 \rightarrow H2$ through the four sequential action contacts $A_0$ to thereby successively repeat the normal and reverse rotation of the associated motors. Thus, the fork 4 in the cage is moved to follow the fork operation explained with reference to the relay A1 in the preceding table, and the vehicle at the inlet of the first story is carried into the cage. After the vehicle has been carried into the cage, the contacts PH-C of the photoelectric unit in the cage are closed, in FIG. 5, to energize the in-cage entrance detecting relay 65C. The contacts PH-H are now open to deenergize the first story parking space entrance detecting relay 65H. Since, at the same time, the four sequential action completion contacts A1F of FIG. 9 are urged to the closed position, the elevator starting ordering relay 100P is energized through the circuit of $(+)-A1F-100P-(-)$, and the self-sustaining circuit of the relay 100P is formed by the circuit of $(+)-10X_{b5}-100P_{a1}-45B_{b2}-100P-(-)$. Energization of the relay 100P energizes the elevator direction selecting circuit relay E through the circuit of $(+)-100P_{a4}-45B_{b3}-45C_{b2}-E-(-)$. Then, the circuit selected for the upward movement is actuated as described above as the elevator is positioned at the first story, and the main lifting motor normal rotation relay E1 is energized through the circuit of $(+)-SE-43A_{a2}-E_0-E2_{b1}-E1-LS_5-(-)$ in FIG. 10, said relay being immediately self-sustained through the circuit of $(+)-91_{b1}-E1_{a1}-E2_{b1}-E1-LS_5-(-)$. Therefore, the main lifting motor $M_1$ makes normal rotation to start lifting of the elevator. As the elevator starts to move upwardly, the travelling cage relay 10X of FIG. 9 is energized by the closure of the contacts $E1_{a6}$, and the starting ordering relay 100P is deenergized due to opening of the contacts $10X_{b5}$ in the self-sustaining circuit of said relay 100P. The contacts A1F have already been opened with the predetermined time limit. When the elevator has taken off the first story, the floor controller contacts $FC_1$ of FIG. 5 are opened to deenergize the first story position relay 30. When the cage carrying the vehicle therein reaches the preset position adjacent the desired story or the ninth story, the contacts $SDUL_9$ of the upward movement deceleration floor controller in FIG. 6 are urged to the closed position. Since, as described previously, the main lifting motor normal rotation relay E1, entrance relay 70L and entrance ordering relay 79L for the left-hand side parking space of the ninth story are kept energized, the contacts $E1_{a2}$, $70L_{a2}$ and $79L_{a4}$ of respective relays are closed. Therefore, the elevator deceleration relay 92 is energized through the circuit of $(+)-92-70L_{a2}-E1_{a2}-SDUL_9-79L_{a4}-(-)$ of FIG. 6 to close the contacts $92_{a1}$, and the relay 92 is self-sustained through the circuit of $(+)-92-92_{a1}-10MD_{b1}-(-)$. By the energization of the deceleration relay 92, the elevator starts to be decelerated towards the desired floor or the ninth story, and, when it reaches the predetermined stopping position, stoppage is ordered. Then, the contacts $91_{b1}$ of the stoppage ordering relay 91 of FIG. 10 are urged to the open position to release the self-sustaining circuit of the main lifting motor normal rotation relay E1, and the cage is brought to stoppage. (In this case, the main lifting motor $M_1$ is subject to braking, but this is not illustrated.) When the elevator stops at the predetermined position, the contacts $10X_{b3}$ of the travelling cage relay 10X and the contacts $92_{a2}$ of the deceleration relay 92 in FIG. 7 are urged to the closed position. Since, further, the cage stopped position checking switch ZCH is also closed, the circuit $(+) - ZCH - 92_{a2} - 10X_{b3} - 10M - (-)$ is formed to energize the fork operation ordering relay 10M. At the same time, the normally open contacts of the contacts $10M_{a1}$ are closed to form the self-sustaining circuit of $(+) - 30_{T1}$ (normally closed contact side) $-100P_{b1} - 10M_{a1} - 10X_{b3} - 10M - (-)$, and the successive fork operation is ordered.

Figure 10:
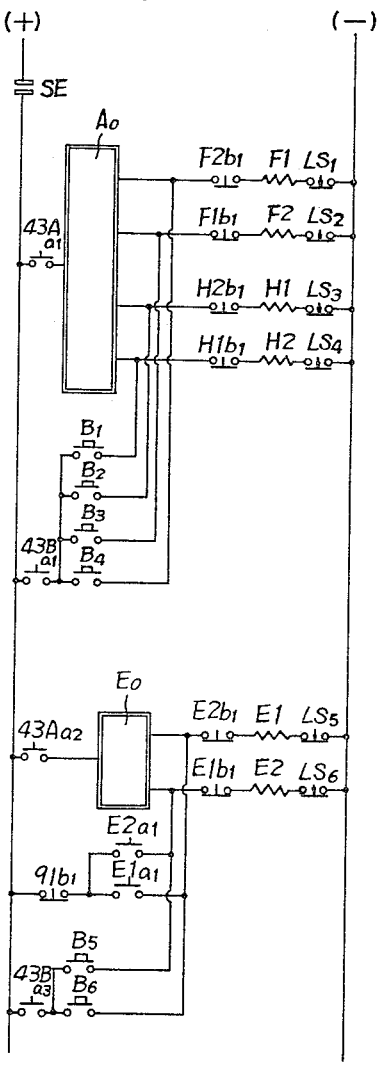

As a result of energization of the relay 10M, its contacts $10M_{b2}$ in FIG. 4 are urged to the open position to release the self-sustaining circuit of the parking floor entrance ordering relay 79L, which is thereby deenergized. Further, the contacts $10M_{a3}$ in FIG. 7 are closed to energize the fork operation ordering relay 10MD, and the contacts $79L_{a4}$ and $10MD_{b1}$ in FIG. 6 are opened to deenergize the elevator deceleration relay 92. The contacts $79L_{a2}$ of FIG. 5 are opened as a result of the deenergization of the relay 79L, but the entrance relay 70L still remains in its self-sustained condition. Subsequently, the normally open contacts of the contacts $10M_{T1}$ in FIG. 9 are urged to the closed position, but the contacts $30_{T4}$ of the first story position relay 30 are not actuated and closed at the normally closed contacts. Further, by the opening of the contacts $30_{a2}$ and the closure of the contacts $70L_{a8}$ of the entrance relay 70L, the sequential action circuit of the relay A3 is selectively energized through the circuit of $(+) - 10M_{T1}$ (normally open contact side) $- 30_{T4}$ (normally closed contact side) $- 70L_{a8} - A3 - (-)$. By the energization of the relay A3, the fork mechanism operates in the manner as described in the foregoing table, and the motor normal and reverse rotation relays of FIG. 10 successively operates in order of H1→F1→H2→F2. Thus, the motors successively repeat normal and reverse rotation in the order of $M_3$→$M_2$→$M_3$→$M_2$ to bring the vehicle into the left-hand side parking space of the ninth story. After the vehicle has been brought into the parking space, the full-empty detecting contacts 69L of FIG. 4 are urged to the closed position to energize the full-empty detecting relay 59L to urge the contacts $59L_{a2}$ to the closed position. Then, the lamp-lighting push button switch 9L for the left-hand side parking space of the ninth story is lit through the circuit of $(+) - 59L_{a2} - LAMP-9L - (-)$ to indicate the left-hand side parking space of the ninth story is now full (parking). At the completion of entrance of the vehicle therein, the contacts PH-C of the in-cage photoelectric unit are opened to deenergize the in-cage entrance detecting relay 65C. Further, the fork operation completion contacts A3F in FIG. 4 are urged to the closed position to re-energize the elevator starting ordering relay 100P. At the same time, by the closure of the contacts $100P_{a2}$, the first story returning relay 51S is energized through the circuit of $$(+) - 30_{b3} - 100P_{a2} - 45B_{b1} - 51S - (-)$$

and return of the elevator to the first story is ordered to the elevator direction selecting circuit relay E. Thus, the direction selecting relay E is energized through the circuit of $(+) - 100P_{a4} - 45B_{b3} - 45C_{b2} - E - (-)$ of FIG. 9 to give an order for the elevator to move downwardly. The main lifting motor reverse rotation relay E2 is thereby energized through the circuit of $$(+) - SE - 43A_{a2} - E_0 - E1_{b1} - E2 - LS_6 - (-)$$

of FIG. 10, and the elevator starts to move downwardly towards the first story. Prior to the operation of the elevator, the contacts $65C_{b1}$ and $100P_{a3}$ in FIG. 7 have been urged to the closed position. Therefore, the entrance operation completion relay 10FB is energized through the circuit of $(+) - 65C_{b1} - 30_{T3}$ (normally closed contact side) $- 100P_{a3} - 70D_{a1} - 10FB - (-)$ to urge the contacts $10FB_{b2}$ to the open postion. Thus, the self-sustaining circuit of the entrance relay 70L in FIG. 5 is released to deenergize the entrance relay 70L. Since the contacts $100P_{b1}$ in FIG. 7 have been urged to the open position and the deceleration relay 92 has already been deenergized, the contacts $92_{a2}$ thereof are also urged to the open position to deenergize the fork operation ordering relay 10M. Meanwhile, the elevator continues to move downwardly until finally it reaches the preset position before the first story to close the downward movement floor controller contacts $SDDL_1$ and $SDDR_1$ for the first story shown in FIG. 6. Since, at the same time, the contacts $E2_{a4}$ and $E2_{a5}$ of the main lifting motor reverse rotation relay E2, and the contacts $70R_{b5}$ and $70L_{b5}$ of the entrance relays are urged to the closed position, the elevator deceleration relay 92 is re-energized through the circuit of $$(+) - 92 - 70R_{b5} - 70L_{b5} \genfrac{<}{>}{0pt}{}{E2_{a4} - SDDL_1}{E2_{a5} - SDDR_1} (-)$$

Thus, by the closure of the contacts $92_{a1}$, the self-sustaining circuit of the relay 92 is formed by the circuit of $(+) - 92 - 92_{a1} - 10MD_{b1} - (-)$, so that the elevator is decelerated.

Although there is no need of separately providing the decelerating floor controller contacts for the left-hand and right-hand side entrance spaces of the first story, it is assumed that two contacts are provided in this explanation to provide ease of understanding. When the elevator reaches the predetermined stopping position, the contacts $91_{b1}$ of the stoppage ordering relay 91 in FIG. 10 are urged to the open position to deenergize the relay E2, and the elevator is brought to a halt at the first story. Then, the floor controller contacts FC1 in FIG. 5 are closed to reenergize the first story position relay 30. At the same time, the contacts $92_{a2}$ and $10X_{b3}$ and the stopped position checking switch ZCH in FIG. 7 are urged to the closed position to energize the fork operation ordering relay 10M. On the other hand, the contacts $92_{a3}$ are simultaneously urged to the closed position to form the circuit $(+) - 65C_{b1} - 30_{T3}$ (normally open contact side)

$$- 92_{a3} - 10FA - (-)$$

Thus, the departure operation relay 10FA is energized to urge the contacts $10FA_{a1}$ to the closed postion, and the self-substaining circuit is formed by the circuit of $(+) - 10MD_{b2} - 10FA_{a1} - 10FA - (-)$. Therefore, the contacts $10FA_{b3}$ are urged to the open position, and the self-sustaining circuit of said fork operation ordering relay 10M can not form. By the energization of the relay 10M, the contacts $10M_{a3}$ are urged to the closed position to energize the fork operation order time limit relay 10MD. The deceleration relay 92 of FIG. 6 is deenergized since the self-sustaining circuit thereof is released by the opening of the contacts $10MD_{b1}$, and, at the same time, the contacts $92_{a2}$ in FIG. 7 are opened to deenergize the fork operation ordering relay 10M. By the deenergization of the relay 10M, the contacts $10M_{a3}$ are urged to the open position and the relay 10MD is deenergized. However, owing to the delayed action of the relay 10MD, the contacts $10MD_{b2}$ in the self-sustaining circuit of the departure operation completion relay 10FA are urged to the open position after the relay 10M has been deenergized, and then the relay 10FA is deenergized.

The above operation will complete all the procedures required for the entrance of the vehicle into the desired parking space and all the elements in the system are restored to the condition before the entrance operation. Thus, the system is ready for receiving a successive order.
It will be understood that the travelling position of the elevator is always indicated on the control panel by the circuits of $(+)-FC'_9-13_9-(-)$ through $(+)-FC'_1-13_1-(-)$ in FIG. 8.

(ii) *Departure*

Hereinunder, explanation will be given with regard to a case of bringing out the vehicle parked in the left-hand side parking space of the ninth story by said entrance operation. In the following explanation, what is readily inferable from the explanation of the entrance operation is omitted to simplify the description.

Assume that the elevator cage is now standing by at the first story. Due to the fact that the left-hand and right-hand side parking spaces of the ninth story are now full, the lamp-lighting push buttons 9L and 9R on the control panel of FIG. 3 are lit to indicate that those spaces are full. The full-empty detecting contacts 69L, in FIG. 4, for the left-hand side parking space of the ninth story are now urged to the closed position. Therefore, the full-empty selecting relay 59L is energized to urge its contacts $59L_{T1}$ to a condition at which the departure ordering relay 89L can solely be energized. This is entirely the same for the right-hand side parking space of the ninth story. In this case, it is assumed that there is no vehicle at the inlet of the first story. Therefore, the contacts PH-H of the photoelectric unit of FIG. 5 are not closed and the first story entrance space entrance detecting relay 65H is in its deenergized state. When both doors at the inlet and outlet of the first story are closed, the positon contacts $C_{a1}$ in FIG. 4 are closed and the contacts $65H_{T1}$ are not actuated likewise. In this case, the departure indicating relay B is energized through the circuit of $(+)-C_{a1}-65H_{T1}$ (normally closed contact side)$-A_{b1}-B-(-)$ to urge the contacts $B_a$ to the closed position.

Then, when the push button 9L on the control panel of FIG. 3 is depressed to bring the vehicle out of the left-hand side parking space of the ninth story, the switch 9L in FIG. 4 is closed to energize the departure ordering relay 89L through the circuit of $(+)-9L-59L_{T1}$ (normally open contact side)$-B_{a1}-89L-(-)$, and, at the same time, the self-sustaining circuit of the relay 89L is formed by the circuit of $(+)-10M_{b1}-89L_{a1}-89L-(-)$ By the energization of the relay 89L, the contacts $89L_{a3}$ in FIG. 5 are urged to the closed position to deenergize the entrance order detecting relay 45A. At the same time, the contacts $89L_{a2}$ are urged to the closed position to selectively energize the departure relay 80L which is thereby self-sustained. Thus, the contacts $80L_{a5}$ in FIG. 7 are urged to the closed positions to energize the departure time limit relay 80D. Therefore, the contacts $80D_{T1}$ in FIG. 9 are actuated (normally open contacts urged to the closed position). Since the fork 4 is disposed centrally of the cage, the limit switch 33S is closed, and since the cage is empty, the contacts $65C_{b2}$ of the full-empty relay 65C are closed. Therefore, the departure and elevator starting ordering relay 100Q is energized through the circuit of $(+)-80D_{T1}$ (normally open contact side) $-30_{a4}-65C_{b2}-33S-100Q-(-)$ to order the starting of the elevator. Further, by the energization of the relay 100Q, the contacts $100Q_{a4}$ are urged to the closed position to energize the elevator direction selecting circuit relay E through the circuit of $(+)-100Q_{a4}-45B_{b3}-45C_{b2}-E-(-)$ Therefore, the main lifting motor normal rotation relay E1 in FIG. 10 is energized to move the elevator upwardly. When the elevator reaches the preset position before the ninth story, the circuit of $(+)-92-80L_{a2}-E1_{a2}-SDUL_9$
$-89L_{a4}-70L_{b4}-70R_{b4}-(-)$ is formed in FIG. 6, since the contacts $80L_{a2}$ and $80L_{a4}$ are urged to their closed position. Thus, the elevator deceleration relay 92 is energized to urge its contacts $92_{a1}$ to the closed position and self-sustained through the circuit of $(+)-92-92_{a1}-10MD_{b1}-(-)$. The elevator, therefore, is decelerated.

When the decelerated elevator reaches the predetermined stopping position, the contacts $91_{b1}$ of the stoppage ordering relay 91 in FIG. 10 are urged to the open position to release the self-sustaining circuit of the main lifting motor normal rotation relay E1 to bring the elevator to a halt. By the stoppage of the elevator, the fork operation ordering relay 10M in FIG. 7 is energized in the manner as in the case of the entrance operation to urge the contacts $10M_{a3}$ to the closed position to thereby energize the fork operation order time limit relay 10MD. By the energization of the relay 10M, the contacts $10M_{b1}$ in FIG. 4 are urged to the open position, and the self-sustaining circuit of the departure ordering relay 89L is released to deenergize the relay 89L. Therefore, the contacts $10M_{T1}$ in FIG. 9 are actuated, and the contacts $30_{T4}$ are released from the actuated state as the first story position relay 30 has been deenergized when the elevator has left the first story. On the other hand, by the closure of the contacts $80L_{a7}$, the sequential action circuit relay A1 is selectively energized through the circuit of $(+)-10M_{T1}$ (normally open contact side)$-30_{T4}$ (normally closed contact side)$-80L_{a7}-A1-(-)$. Therefore, the vehicle parking in the left-hand side parking space of the ninth story is carried into the cage in accordance with A1 sequential action (preceding table) in the manner as in the case of transference of the vehicle into the cage from the first story inlet in the entrance operation, but any detailed explanation will not be made here with regard to such operation.

As soon as the vehicle is carried into the cage, the contacts PH-C of the in-cage photoelectric unit in FIG. 5 are urged to the closed position to energize the in-cage entrance detecting relay 65C. Since the left-hand side parking space of the ninth story has been emptied, the contacts 69L of the full-empty detecting means in FIG. 4 are now open to deenergize the full-empty detecting relay 59L to thereby urge the contacts $59L_{a2}$ thereof to the open position. Thus, the circuit of the LAMP–9L is cut off to deenergize the lamp-lighting push button 9L to indicate that the left-hand side parking space of the ninth story is now empty. Then, the A1 operation completion contacts A1F in FIG. 9 are closed to energize the elevator starting ordering relay 100P. At the same time, the contacts $100P_{a1}$ are urged to the closed position and the relay 100P is self-sustained through the circuit of $(+)-10X_{b5}-100P_{a1}-45B_{b2}-100P-(-)$. By the energization of the relay 100P, the contacts $100P_{b1}$ in FIG. 7 are urged to the open position to release the self-sustaining circuit of the relay 10M, which is thereby deenergized. Then, the contacts $100P_{a2}$ are urged to the closed position to energize the first story return relay 51S, which gives the order of return to the first story. At the same time, the contacts $51S_{a1}$ of the relay 51S are urged to the closed position, and, since only the contacts $80L_{a3}$ are urged to the closed position during the departure operation, the relay 51S is self-sustained through the circuit of $(+)-80L_{a3}-51S_{a1}-51S-(-)$. Further, by the energization of the relay 100P, the contacts $100P_{a4}$ in FIG. 9 are urged to the closed position to energize the elevator direction selecting circuit relay E, to which the order for downward movement of the elevator is given due to the fact that the first story return relay 51S has been energized. Therefore, the main lifting motor reverse rotation relay E2 of FIG. 10 is energized, and the elevator starts to move downwardly towards the first story.

When the elevator reaches the preset position near the first story, the deceleration relay 92 of FIG. 6 is energized, as described above, to urge its contacts $92_{a1}$ to the closed position, and the self-sustaining circuit of the relay 92 is formed. When the decelerated elevator reaches the predetermined stopping position at the first story, the contacts $91_{b1}$ of the stoppage ordering relay 91 in FIG. 10 are urged to the open position and the elevator is brought to a halt. Then, the contacts $92_{a3}$ in FIG. 7 are urged to the closed position, but the presence of the vehicle in the cage will urge the contacts $65C_{b1}$ to the open position and the energizing circuit of the departure operation completion relay 10FA will not form. Energization of the relay 92 and stoppage of the elevator at the predetermined position at the first story will re-energize the work operation ordering relay 10M to thereby urge its contacts $10M_{a1}$ to the closed position. Since the normally open contacts of the contacts $30_{T1}$ of the first story position relay 30 are urged to the closed position, the relay 10M is self-sustained through the circuit of $(+)-30_{T1}$ (normally open contact side) $-10FA_{b3}-10M_{a1}-10X_{b3}-10M-(-)$. Therefore, the contacts $10M_{T1}$ and $30_{T4}$ in FIG. 9 are actuated (normally open contacts urged to the closed position). As the contacts $80L_{a8}$ are closed, the four sequential action circuit relay A4 is selectively energized through the circuit of $(+)-10M_{T1}$ (normally open contact side) $-30_{T4}$ (normally open contact side) $-80L_{a8}-A4-(-)$. By the energization of the relay A4, the fork driving motor $M_2$ and auxiliary lifting motor $M_3$ successively repeat the normal and reverse rotation in accordance with the operational sequence shown in the foregoing table in the manner as in the case of entrance operation into the left-hand side parking space of the ninth story. The vehicle is thereby carried into the right-hand side exit space at the first story outlet and the departure operation is completed.

Thus, the vehicle is cleared of the cage and the contacts PH-C of the in-cage photoelectric unit in FIG. 5 are urged to the open position to deenergize the in-cage entrance detecting relay 65C. At the completion of the A4 sequential action, the four sequential action completion contacts A4F in FIG. 9 are urged to the closed position. Since, however, the contacts $80D_{T1}$ of the departure relay 80D are under operation (normally open contacts closed, and normally closed contacts open), the starting ordering relay 100P will not be energized. However, as the contacts $65C_{b2}$ are closed due to deenergization of said relay 65C, the contacts 33S are urged to the closed position when the fork returns to the normal position centrally of the cage. The departure and elevator starting ordering relay 100Q is energized through the circuit of $(+)-80D_{T1}-30_{a4}-65C_{b2}-33S-100Q-(-)$. By the energization of the relay 100Q, the elevator direction selecting circuit relay E is re-energized, but the direction selecting order by the relay E is invalid and the elevator remains stopped as the departure ordering relay 89L has already been deenergized. Energization of the relay 100Q urges the contacts $100Q_{a3}$ in FIG. 7 to the closed position, and the opening of the contacts $89L_{a3}$ will release the entrance order detecting relay 45A of FIG. 5 from its short-circuited state to energize the same. Then, the contacts $45A_{a1}$ are urged to the closed position to energize the departure operation completion relay 10FA through the circuit of $(+)-65C_{b1}-30_{T3}$ (normally open contact side) $-45A_{a1}-100Q_{a4}-80D_{a1}-10FA-(-)$. Then, the contacts $10FA_{b3}$ are urged to the open position to release the self-sustaining circuit of the fork operation ordering relay 10M, as described above, to thereby deenergize the relay 10M. At the same time, the self-sustaining circuit of the departure relay 80L in FIG. 5 is released by the opening of the contacts $10FA_{b2}$, and the relay 80L is deenergized. The first story return relay 51S is also deenergized by the opening of the contacts $80L_{a3}$ in the self-sustaining circuit of the relay 51S. Deenergization of the relay 10M urges the contacts $10M_{a3}$ to the open position to thereby deenergize the relay 10MD, and the relay 10FA is deenergized by the delayed action of the relay 10MD. The above operation completes all the procedures required for the departure of the vehicle from the specific parking space and the whole system is restored to the state before the departure operation. The system is now ready for receiving a subsequent order.

(iii) *Successive entrance→departure*

As explained in detail in the foregoing description, the empty elevator cage after the entrance operation is automatically returned to the first story to stand by thereat for a successive order. However, the control system according to the invention is further characterized in that a departure order may be given during the entrance operation so that the empty elevator having finished the entrance operation can immediately take over the departure operation. It will be understood that a highly efficient operation can thereby be attained.

Hereinunder, explanation will be made with regard to a case wherein, when the left-hand side parking space of the ninth story is empty and the right-hand side parking space of the same story is full, an automotive vehicle is newly brought into the left-hand side parking space of the ninth story and successively the vehicle parking in the right-hand side parking space of the ninth story is carried out therefrom.

Assume that the push button switch 9L now being unlit on the control panel of FIG. 3 is manipulated to give the entrance order, and the fork mechanism is actuated in the aforesaid manner to carry the vehicle at the first story inlet into the cage. Then, the contacts PH-H of the photoelectric unit at the first story shown in FIG. 5 are urged to the open position to deenergize the entrance detecting relay 65H so that the contacts $65H_{T1}$ in FIG. 4 are closed at the normally closed contact side. Therefore, the departure indicating relay B is energized through the circuit of $(+)-C_{a1}-65H_{T1}$ (normally closed contact side) $-A_{b1}-B-(-)$. Further, the contacts PH-C of the photoelectric unit in the cage shown in FIG. 5 are urged to the closed position to energize the in-cage entrance detecting relay 65C. Due to the closure of the full-empty detecting contacts 69R for the right-hand side parking space of the ninth story, the relay 59R is energized to urge the normally open contacts of the contacts $59R_{T1}$ to the closed position. The departure indicating relay 89R is energized through the circuit of $(+)-9R-59R_{T1}$ (normally open contact side) $-B_{a2}-89R-(-)$ in FIG. 4. In this case, it will be apparent that the entrance push button is effective through the circuit of $(+)-C_{a1}-65H_{T1}$ (normally open contact side) $-B_{b1}-A-(-)$, since the vehicle to be carried in is positioned at the predetermined position at the first story inlet.

Now, energization of the departure ordering relay 89R urges its contacts $89R_{a1}$ to the closed position so that the relay 89R is self-sustained through the circuit of $(+)-10M_{b1}-89R_{a1}-89R-(-)$. Although the contacts $89R_{a2}$ of the relay 89R in FIG. 5 are urged to the closed position, the contacts $70L_{b3}$ of the entrance relay 70L are urged to the open position and the departure relay 80R will not be energized as the entrance order has already been given and the relay 70L has been energized. Therefore, the departure operation will not be performed until the entrance operation has been completed. Subsequently, the cake carrying the vehicle therein is moved upwardly and stopped at the predetermined position at the ninth story, where the fork operation ordering relay 10M of FIG. 7 is energized in the manner as described in the foregoing description with regard to the entrance operation. Since, in this case, the vehicle is still in the cage, the contacts $65C_{a2}$ in FIG. 4 are closed and the departure ordering relay 89R is still self-sustained through the circuit of $(+)-65C_{a2}-30_{b1}-89R_{a1}-89R-(-)$, even when the contacs $10M_{b1}$ are urged to the open position. As soon as said A3 action takes place, the successive entrance and departure order detecting relay 45B is energized through the circuit of $(+)-70L_{a6}-45B-10M_{a4}-10X_{b3}-89R_{a5}-FC_9-(-)$, due to the fact that the contacts $89R_{a5}$ in FIG. 8 are now in the closed position. Thus, the contacts $45B_{a1}$ of the relay 45B are urged to the closed position and the relay 45B is self-sustained through the circuit of $(+)-80D_{b1}-45B_{a1}-45B-10M_{a4}-10X_{b3}-89R_{a5}-FC_9-(-)$. Therefore, the vehicle in the cage is carried into the left-hand side parking space of the ninth story by said A3 action, while the departure indicating relay 89R continues to be energized through the circuit of $(+)-45B_{a2}-30_{b1}-89R_{a1}-89R-(-)$, even when the contacts $65C_{a2}$ in FIG. 4 are urged to the open position. Energization of the relay 10M urges the contacts $10M_{b2}$ to the open position to release the self-sustaining circuit of the entrance ordering relay 79L, which is thereby deenergized. Meanwhile, the A3 action shown in the foregoing table proceeds, and the vehicle in the elevator is brought into the left-hand side parking space of the ninth story. Then, the A3 action completion contacts A3F are urged to the closed position to energize the elevator starting ordering relay 100P. Since, in this case, the sucessive entrance and departure order detecting relay 45B still continues its self-sustaining state, the contacts $45B_{b2}$ are in the open position and the relay 100P is no more self-sustaining. Further, the elevator direction selecting circuit relay E will not be energized as the contacts $45B_{b3}$ are in the open position although the contacts $100P_{a4}$ are urged to the closed position. The elevator, therefore, remains stopped at the ninth story. Meanwhile, the entrance operation completion relay 10FB is energized through the circuit of $(+)-65C_{b1}-30_{T3}$ (normally closed contact side)$-100P_{a3}-70D_{a1}-10FB-(-)$ in FIG. 7. The self-sustaining circuit of the entrance relay 70L of FIG. 5 is released by the opening of the contacts $10F_{b2}$, and the relay 70L is thereby deenergized. At the same time, the contacts $70L_{b3}$ are urged to the closed position, and the circuit comprising $(+)-89R_{a2}-70R_{b2}-80R-70L_{b3}-80L_{b3}-(-)$ is formed by the closure of the contacts $89R_{a2}$ of the already registered departure ordering relay 89R. The departure relay 80R is thereby energized and self-sustained through the circuit of $(+)-10FA_{b2}-80R_{a1}-70R_{b2}-80R-70L_{b3}-80L_{b3}-(-)$. Therefore, the elevator deceleration relay 92 is re-energized through the circuit of $(+)-92-80R_{a2}-10X_{b2}-SDR_9-89R_{a4}-70L_{b4}-70R_{b4}-(-)$ in FIG. 6, and the fork operation ordering relay 10M is energized through the circuit of $(+)-ZCH-92_{a2}-10X_{b3}-10M-(-)$ in FIG. 7.

As soon as the contacts $80R_{a5}$ are urged to the closed position to energize the departure time limit relay 80D the self-sustaining circuits of the relays 45B and 45C of FIG. 8 are released by the opening of the respective contacts $80D_{b1}$ and $80D_{b2}$ and these relays are thereby deenergized.

Subsequently, the four sequential action circuit relay A2 is selectively energized by the circuit of $(+)-10M_{T1}$ (normally open contact side)$-30_{T4}$ (normally closed contact side)$-80R_{a7}-A2-(-)$ in FIG. 9, and the vehicle in the right-hand space of the ninth story is transferred into the cage. Subsequent procedures are entirely as explained with reference to the departure operation. Whole operation is completed after the vehicle has been passed to the outlet of the first story and the fork mechanism has been retracted to the central part of the elevator cage, and the system is now ready for receiving a subsequent order.

The operation involved in bringing out a vehicle parking in, for example, the left-hand side parking space of the eighth story after the vehicle has been carried into the left-hand side parking space of the ninth story is entirely similar to the one described already. In this case, however, the successive entrance and departure order detecting relay 45B of FIG. 8 will not be energized since the successive entrance and departure order is not applied to the same story. The departure order detecting relay 45A in FIG. 5 remains deenergized by contacts $88L_{a3}$ (not shown), and the non-interference relay 45C in FIG. 8 must be energized through the circuit of $(+)-30_{b2}-45A_{b1}-10MD_{a1}-45C-(-)$. The entrance order must be changed over to the departure order and then the elevator must be moved to the story from which the vehicle is to be carried out. Therefore, after the vehicle has been carried into the left-hand side parking space of the ninth story by the A3 sequential action as described with reference to FIG. 9, a self-sustaining circuit of the elevator starting ordering relay 100P must be formed by the circuit of $(+)-10X_{b5}-100P_{a1}-45B_{b2}-100P-(-)$ when the relay 100P is energized by the closure of the contacts A3F. This can readily be attained as the relay 45B is not energized as described above. When the elevator starts its downward movement and reaches the preset position near the eighth story, the contacts $SDDL_8$ (not shown) of the downward movement deceleration floor controller is urged to the closed position. Therefore, the elevator deceleration relay 92 is energized through the circuit of $(+)-92-80L_{a2}-E2_{a2}-SDDL_8-88L_{a4}-70L_{b4}-70R_{b4}-(-)$, and self-sustained through the circuit of $(+)-92-92_{a1}-10MD_{b1}-(-)$ for decelerating the elevator moving towards the eighth story. When the decelerated elevator reaches the predetermined stopping position at the eighth story, the contacts $91_{b1}$ of the stoppage ordering relay 91 are urged to the open position to bring the elevator to a halt. The vehicle parking in the left-hand side parking space of the eighth story is likewise carried down to the first story entrance floor and the elevator stands by thereat for a subsequent order. The operation is entirely similar in case of a successive operation wherein the parking space from which a vehicle is to be carried out is higher than the parking space in which a vehicle is to be carried.

What is claimed is:

1. A fully automatic control system adapted for a parking building comprising an elevator shaft, an elevator cage reciprocatively movable in the vertical direction in said elevator shaft for carrying an automotive vehicle placed therein, a plurality of parking spaces disposed in tiered relation adjacent to and on either side of said elevator shaft, said parking spaces including one at a specific story assigned for a vehicle ride-in floor to which a vehicle enters from outside, and means for effecting transference of a vehicle between said elevator cage and each of said parking spaces and between said elevator cage and said vehicle ride-in floor, first detecting means for detecting the presence or absence of a vehicle in each of said parking spaces, second detecting means for detecting the presence or absence of a vehicle on said ride-in floor and an outlet floor, indicating means responsive to said first detecting means and corresponding to each of said parking spaces for indicating the presence of a vehicle in a respective parking space, demanding means corresponding to each of said parking spaces whereby carriage of a vehicle into or out of any selected parking space can be automatically effected, a lifting and lowering sequence means for controlling the lifting and lowering operation of said elevator, vehicle transference sequence means for controlling a mode of operation in said vehicle transference means, and selective means for effecting carriage of a vehicle into or out of said parking spaces for controlling said lifting and lowering sequence means and said vehicle transference sequence means in response to said demanding means and said first and second detecting means.

2. A fully automatic control system adapted for a parking building according to claim 1 characterized by further comprising sequence control means for interrelating said lifting and lowering sequence means with said vehicle transference sequence means to make said sequences proceed alternately, said sequence control means being controlled by said selective means.

3. A fully automatic control system adapted for a parking building comprising an elevator shaft, an elevator cage reciprocatively movable in the vertical direction in said elevator shaft for carrying an automotive vehicle placed therein, a plurality of parking spaces disposed in tiered relation opposite said elevator shaft, said parking spaces including one at a specific story assigned for a vehicle ride-in floor to which a vehicle enters from outside, and means for effecting transference of a vehicle between said elevator cage and each of said parking spaces and between said elevator cage and said vehicle ride-in floor, first detecting means for detecting the presence or absence of a vehicle in each of said parking spaces, second detecting means for detecting the presence or absence of a vehicle on said ride-in floor and an outlet floor, indicating and demanding means each corresponding to each of said parking spaces, a lifting and lowering sequence means for controlling the lifting and lowering operation of said elevator, vehicle transference sequence means for controlling a mode of operation in said vehicle transference means, selective means for effecting carriage of a vehicle into or out of said parking spaces for controlling said lifting and lowering sequence means and said vehicle transference sequence means in response to said demanding means and said first and second detecting means, sequence control means for interrelating said lifting and lowering sequence means with said vehicle transference sequence means to make said sequences proceed alternately, said sequence control means being controlled by said selective means, and sequence checking means for checking the operating condition at each end of either of said sequences, giving an order to said sequence control means after such checking and then allowing the successive sequence to start.

4. A fully automatic control system adapted for a parking building according to claim 3 characterized in that means are provided so that, when the departure order is given within a predetermined period after the entrance order has been given, completion of the entrance of a vehicle into any desired parking space is checked to immediately start the sequence of departure operation for bringing out a vehicle from any desired parking space.

References Cited by the Examiner
UNITED STATES PATENTS

| | | | |
|---|---|---|---|
| 1,816,053 | 7/1931 | McGavin. | |
| 2,647,647 | 8/1953 | Alimanestiano | 214—16.1 |
| 2,691,448 | 10/1954 | Lontz | 214—16.1 |
| 2,696,921 | 12/1954 | Desjardins | 214—16.1 |
| 2,705,570 | 4/1955 | Maissian | 214—16.1 |
| 2,923,421 | 2/1960 | De Roumefort | 214—16.1 |
| 3,049,247 | 8/1962 | Lemelson | 214—16.4 |
| 3,139,994 | 7/1964 | Chasar | 214—16.4 |

GERALD M. FORLENZA, *Primary Examiner.*

R. B. JOHNSON, *Assistant Examiner.*